United States Patent [19]
Mitchell

[11] 3,732,588
[45] May 15, 1973

[54] PAYLOAD DEPLOYMENT SYSTEM

[75] Inventor: John E. Mitchell, Huntington Beach, Calif.

[73] Assignee: The Biome Company, Inc., Huntington Beach, Calif.

[22] Filed: Nov. 16, 1970

[21] Appl. No.: 89,586

[52] U.S. Cl. .................................................9/8 R
[51] Int. Cl. .............................................B63b 21/52
[58] Field of Search ..............................9/8 R, 8 P; 114/.5 R, .5 D; 73/170, 300

[56] References Cited

UNITED STATES PATENTS

| | | | |
|---|---|---|---|
| 2,938,352 | 5/1960 | Knapp et al. | 114/0.5 D |
| 3,390,408 | 7/1968 | Lockwood et al. | 9/8 R |
| 3,605,147 | 9/1971 | Shelton | 9/8 R |
| 3,314,009 | 4/1967 | Murdock | 73/170 A X |

Primary Examiner—Milton Buchler
Assistant Examiner—Gregory W. O'Connor
Attorney—Smyth, Roston & Pavitt

[57] ABSTRACT

A payload deployment system includes an elongated shaft member having a positive buoyancy relative to the environment in which the payload is to be deployed. This elongated shaft member includes at least one recessed portion forming a latching station. A payload having a positive buoyancy relative to the environment has a portion surrounding the elongated shaft member to allow the payload to be guided for deployment by the elongated shaft member. At the top of the payload there is a series of dogs or latches for latching with the recessed portion of the elongated shaft member. A deployment and retrieval device having a negative buoyancy great enough to overcome the positive buoyancy of the payload is placed over the shaft to force the payload to various positions along the shaft and to operate the latches on the payload.

16 Claims, 8 Drawing Figures

PATENTED MAY 15 1973

INVENTOR:
John E. Mitchell

By Smyth, Roston & Pavitt
Charles H. Schwartz
ATTORNEYS

PAYLOAD DEPLOYMENT SYSTEM

BACKGROUND OF THE INVENTION

The present invention is directed to a payload deployment system which may be used for positioning of payloads such as instruments, measuring devices, monitoring systems, detection equipment, etc., at a predetermined location in a particular environment such as an underwater environment. The payloads may be maintained at the predetermined location for the desired period of time in order to accomplish the particular form of measuring or monitoring and the payload may then be retrieved at the desired time. If desired, a plurality of such payloads may be positioned at different depths so as to provide for a measuring or testing of either a plurality of conditions or the same condition at the different depths.

It is to be appreciated that the particular form of monitoring or testing equipment does not form a part of the invention and the invention may be used for deploying any type of payload. It is also to be appreciated that although the invention is described with reference to an underwater deployment such as in oceans, seas, bays, waterways, etc., it is to be appreciated that the invention may be used in any type of fluid environment such as liquids other than water and in gaseous environments.

It is often desired to provide for the deployment of payloads in fluid environments such as underwater environments, wherein such payloads can be deployed, serviced, maintained and retrieved from small surface vessels without the need for divers, submarine, or large vessels, and without the need for stationary or floating platforms arranged about the area of deployment. The present invention provides for such deployment with a minimum amount of surface equipment and operators.

Another problem with present deployment systems in addition to the relatively large expenditure for operators and vessels, is that they often provide for a navigational hazard because of their size or motion in the water.

The prior art of ocean monitoring equipment which allowed for a prolonged stationary capacity has generally incorporated the use of payload which has been attached to and supported by either a ball, bell, disc, ring, or spar buoy floatation system using wire, cable or hawser line to interconnect the payload to an anchor and also to interconnect the payload with the buoy. In order to overcome motion caused by natural hydrodynamic phenomena such as currents, tides, swells, waves and winds, combinations of submerged and surface floats are often used with the monitoring or instrumented payload attached to these floats using interconnecting wires. The payloads, when submerged, are usually serviced by divers. Either the anchors and floats may be relatively permanent with the payloads attached and detached using divers, or the anchors and floats may be lightweight so that the entire structure may be deployed and retrieved in their entirely from the surface. The use of such lightweight floats and anchors, however, does not provide for an exact anchoring position so that the payload may move about to different locations.

Other methods that have been used include the use of on-bottom stations which are again serviced by divers. In order to eliminate the constant deployment and retrieval of payloads by divers, some sophisticated systems use electronic data acquisition with telemetry systems for use with on-shore reception and recording. It is to be appreciated that such systems are relatively complex and expensive. In most cases, therefore, either heavy gear and/or divers are required to deploy, service, retrieve, and maintain an exact on-station system.

Other problems with the existing systems relate to hydrodynamic turbulences, since such turbulences are relatively large and are directly proportional to the surface and frontal area of the floating object. The surface floats therefore receive the greatest dynamic motion and in turn transmits this motion to submerged components. The submerged components, although experiencing a lesser degree of motion, do add to the stress of the interconnecting wires and lines.

The dynamic impacts caused by a string of hydrodynamically resistant shapes moving in random directions and tied together with flexible lines, multiplies the dynamic loading and this necessitates strong components in the flexible lines and in the method of fixation to the floating components. In addition, the dead weight of the components must be supported and it is therefore seen that the strength requirements and weight of all of the components are increased greatly.

The present invention provides for a minimum sized system so that no navigational hazard is created, but wherein the deployment apparatus may be easily detected because of its relatively tall vertical profile and may also be detected using electronic apparatus such as radar. Although the present apparatus does have a relatively large vertical profile so as to be highly visible, it has a minimum horizontal profile so as to provide for a relatively small current resistance to maintain its vertical attitude from the point of anchorage of the deployment apparatus. The present deployment system therefore does not have large motions within the water and because of a positive but near neutral buoyancy there is a minimum of hydrodynamically transmitted forces within the system.

Another advantage of the present invention is in the use of pressure equalization in all of the components so that payloads may be submerged to maximum depth and still resist the pressures of that environment.

The present invention includes the use of a payload deployment system incorporating a hollow structural columnar shaft member which is filled with a buoyant compressive resistant fluid so as to give buoyancy to the shaft and with the shaft including at least one recessed portion which serves as a latching station. The shaft may also include a mechanism for providing pressure equalization between the fluid within the shaft and the water surrounding the shaft. The shaft may have a relatively small frontal surface area so as to minimize hydrodynamic forces. The present invention does not include a conventional surface buoy but the shaft extends vertically above the water so that the shaft is visible. The columnar member may be constructed from a plurality of shaft sections which are connected together to form a continuous columnar member or the individual shaft sections may be interconnected by lines to form the columnar member. When the shaft sections are linked by lines, the columnar member is still designed to have an overall positive buoyancy.

The payload includes an open area which is constructed to surround the shaft. The payload also includes a chamber which is filled with a fluid having a positive buoyancy so that the entire payload also has a positive buoyancy. The payload includes a latching means which is designed to engage the recessed portion of the elongated shaft. The open area of the payload is slipped over the shaft but because of the positive buoyancy of the payload, a deployment means is used.

The deployment means also includes an open portion designed to surround the shaft and the deployment means has a negative buoyancy of a value sufficient to overcome the positive buoyancy of the payload. The deployment means forces the payload to slide down the shaft and the payload is therefore guided by the shaft to the position where the latching means of the payload engages the recessed portion of the shaft to thereby latch the payload of the latching station. The above procedure provides for the deployment of the payload at a predetermined position along the elongated shaft and therefore at a predetermined depth in the water.

When it is time to retrieve the payload, the deployment means includes unlatching means which, when placed in an operative position, provides for an unlatching of the latching means of the payload. The deployment means is sent down the shaft to unlatch the payload and the payload because of its positive buoyancy characteristics automatically rises toward the surface. It is to be appreciated that a plurality of latching stations may be provided using a plurality of recessed portions located at predetermined positions along the elongated shaft member.

The present invention therefore provides for a constant captivity of the payload at a particular latching station. The deployment, locking and unlocking of the payload is accomplished using a single deployment means and the payload automatically retrieves itself due to its positive buoyancy.

The present invention therefore provides for a simpler surface handling over conventional systems and eliminates the need for large vessels or great numbers of persons to deploy monitoring or testing apparatus. A clearer understanding of the invention will be had with reference to the following description of the drawings, wherein:

FIG. 7 illustrates the columnar deployment apparatus of the present invention being a plurality of shaft sections linked by lines; and, FIG. 8 illustrates in detail the attachment of the lines to the shaft sections.

Figure 1:
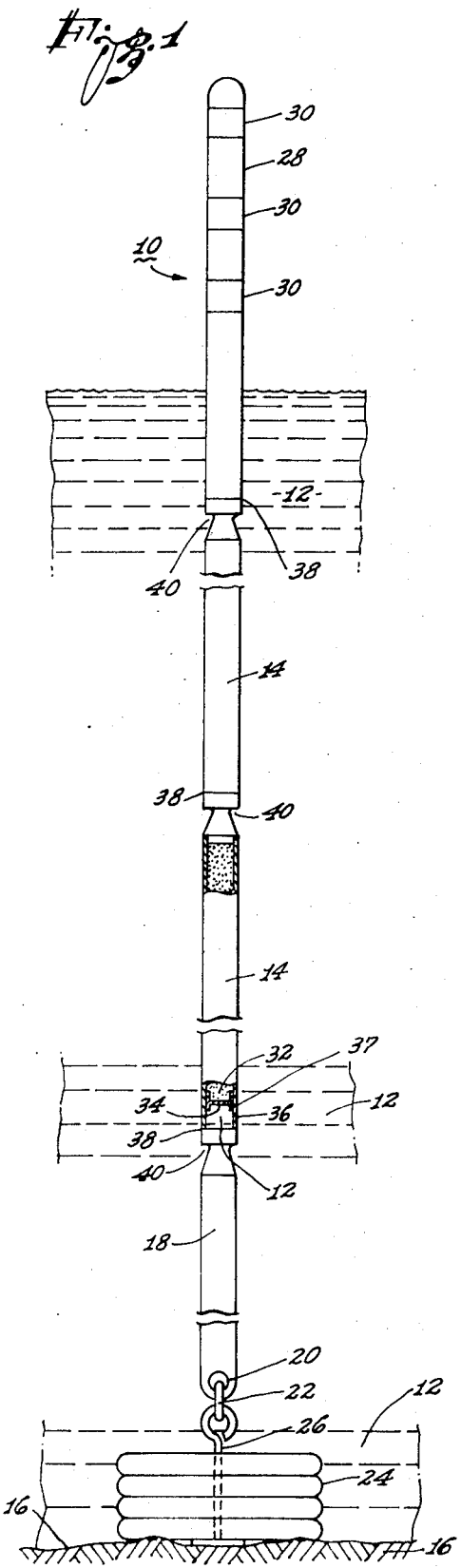
FIG. 1 illustrates the columnar deployment apparatus of the present invention within a particular environment such as an underwater environment.

In FIG. 1 the columnar deployment apparatus 10 is shown in a particular environment such as water 12. The columnar deployment apparatus 10 is formed as an elongated shaft member including a plurality of substantially identical shaft sections 14 of which two are shown in FIG. 1. It is to be appreciated that any number of such sections 14 may be included so as to provide for a desired length of the elongated shaft member 10 to extend to the ocean floor 16.

The elongated shaft member 10 may also include a bottom section 18 which has slight differences from the sections 14. Specifically, the section 18 may include an opening 20 which receives a ring member 22. An anchor 24 which may be composed of a plurality of weights is coupled to the ring 22 through the use of an eye bolt 26. The anchor 24 insures that the elongated shaft member 10 is deployed at a specific location on the ocean bottom 16 and will be maintained at such location. The use of the eye bolt 26 and ring 22 allows for a certain amount of flexibility in movement between the elongated shaft member 10 and the anchor 24 but it is to be appreciated that the elongated shaft member 10, because it is relatively small in diameter, and has a smooth outer surface, presents a relatively small, smooth frontal area to the water 12 and, therefore, does not receive large hydrodynamic forces.

An uppermost one 28 of the sections forming the elongated shaft member 10 may extend out of the water 12 and may include reflective tape portions 30 which serve to provide for a visual detection of the elongated shaft member 10 and also to allow for a radar detection of the elongated shaft member 10. The uppermost section 28 may extend a significant vertical distance in the air above the water so that it is readily visible. It can be seen that because of the relatively small diameter of the elongated shaft member 10 and because of the smooth outer portion of the shaft member, there is a small, smooth frontal area presented to the surface of the water 12. It is in this upper surface area where waves cause relatively large hydrodynamic forces and the design of the present invention minimizes such forces in the elongated shaft member.

The sections 14 and the sections 18 and 28 may be hollow and may be filled with a buoyant compression resistant fluid such as gasoline or other fluids so as to provide for a positive buoyancy in the elongated shaft member 10. This positive buoyancy should be not too large so as to overcome the weight of the anchor 24 and should generally be near neutral but on the positive buoyancy side. The elongated shaft member 10 essentially floats upward from the point of attachment to the anchor 24 and because of its minimal frontal surface to the water 12 will maintain this relatively vertical position even when subjected to underwater and surface currents.

Each section of the shaft member 10, in addition to being filled with the compressive buoyant fluid 32, may include a movable seal 34 which compensates for pressure variations in the water. The buoyant compression resistant fluid 32 which fills the sections of the elongated shaft member 10 resists the compressive force of the water 12 so that the shaft member is not collapsed and the use of the seals 34 allows for the water 12 to enter a section of the elongated shaft member through an opening 36 and thereby provide for pressure equalization between the water 12 and the fluid 32. A stop member 37 is used to prevent the seal 34 from falling below a particular point.

The various sections of the elongated shaft member are coupled together as shown by the joints 38 by using any suitable mechanical coupling means or the sections may be permanently coupled together. The top portion of each of the sections of the elongated shaft member 10 with the exception of the uppermost section may be formed with a recessed portion 40, which recessed portion forms a latching station. It is to be appreciated that each section does not have to have such a recessed portion and that only selected ones of the sections, or only one of the sections, may have a recessed portion 40.

The recessed portions 40 are shown to be conic in shape and uniformly recessed around the circumference of the elongated shaft member 10. The recessed portions 40 cooperate with a latching means included with a payload in a manner to be described so as to provide for the latching of a payload at preselected positions along the elongated shaft member 10.

It is to be appreciated that the elongated shaft member shown in FIG. 1 is anchored at the bottom 16 of the water using the anchor 24, but in cases of shallow water the lowermost portion of the elongated shaft member 10 may merely be driven into the bottom 16 to provide for location at a particular position.

It is also to be appreciated that although the elongated shaft member is shown to include a buoyant compression resistant fluid 32, in cases of shallow water where the water pressure is not great, the fluid may be a gas such as air or even a gas which is lighter than air. If the water is shallow enough and if the elongated shaft member 10 is driven into the bottom, the elongated shaft member 10 may even have a buoyancy which is negative relative to the water.

It is also to be appreciated that although the elongated shaft member 10 is shown deployed within an underwater environment, the elongated shaft member may be deployed in other environments such as fluids other than water or even in a gaseous environment such as the atmosphere. In such a case the elongated shaft member 10 may be filled with a fluid such as a gas lighter than air and may be anchored on the ground to float upward from that point.

Figure 2:
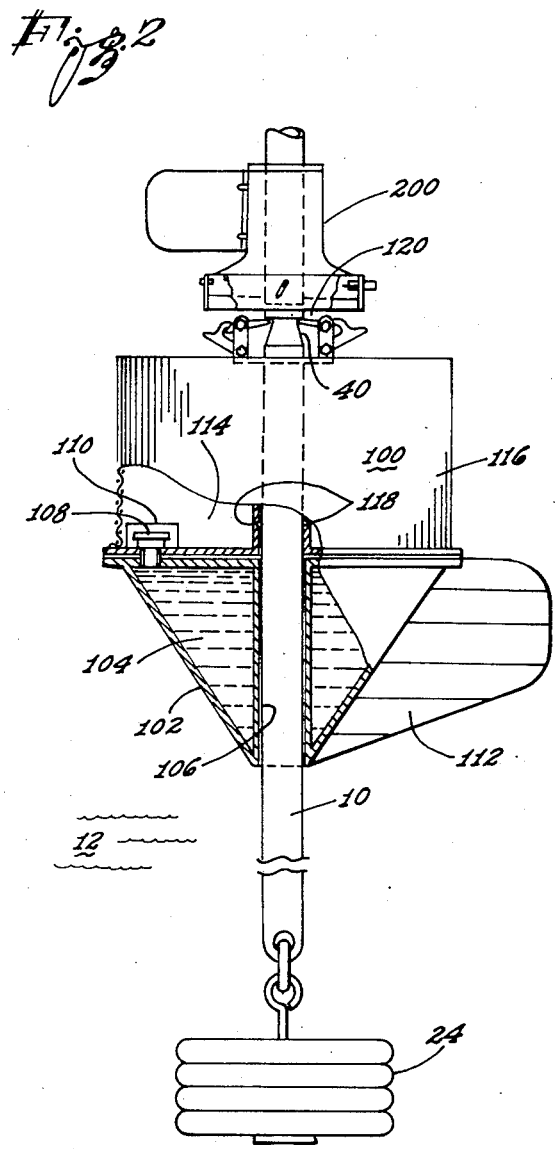
FIG. 2 illustrates a payload disposed at a particular latching station along the columnar deployment apparatus within the underwater environment.

FIG. 2 illustrates a payload 100 and a deployment means 200 located along the elongated shaft member 10 in the environment such as the underwater environment 12. The payload 100 is shown to be latched at a recessed portion 40 forming a latching station and the deployment means 200 is shown to be descending the elongated shaft member 10 and specifically descending to unlatch the payload 100 to provide for retrieval of the payload 100.

As shown in FIG. 2, the payload 100 includes a floatation chamber 102 which is conic in its outer shape and is filled with a fluid 104 to provide for a near neutral but positive buoyancy for the entire payload 100. An opening 106 through the floatation chamber 102 has a diameter larger than the diameter of the elongated shaft member 10 so as to have the payload 100 guided by the elongated shaft member 10. A filler tube 108 extends from the floatation chamber 102 to provide for filling of the floatation chamber and a cap 110 is used to seal the floatation chamber. A compensation for pressure differentials as the payload descends into water is accomplished through the use of the natural elastic flexure of the conic section 102. The conic shape provides for a relatively low frontal area to the water as the payload descends on the elongated shaft member 10.

A rudder member 112 extends from the floatation chamber 102 and the rudder member is used to control the orientation of the payload 100 to underwater currents. Therefore, the rudder 112 maintains the payload so that the rudder is parallel to the direction of current flow which provides for a maximum current flow through whatever instrumentation of measuring devices are incorporated in the payload. The actual instrumentation and/or measuring equipment may be placed within the upper portion 114 of the payload 100 and the invention is not to be limited to any specific type of payload which may be incorporated in this chamber 114. A screen member 116 may enclose the chamber 114 so as to allow for the passage of the water but also to shield the instrumentation or measuring equipment within the chamber 114 from undesired marine life or any other foreign objects. In order to facilitate the movement of the payload on the elongated shaft member 10, a plurality of bearing members 118 may be included within the chamber area 114 to bear against the shaft 10 and provide for a bearing surface to control the movement of the payload 100 as it descends, ascends or rotates about the shaft member 10.

The volume of the floatation chamber 102 is selected to provide for the maximum fluid capacity for a given maximum payload in the chamber 114. A fluid such as gasoline or other lighter-than-water fluid, may be used to provide for the buoyancy and pressure resistant fluid 104. The fluid 104 may then be mixed with water when the payload is lighter than the maximum payload so as to maintain the near neutral but yet positive buoyancy characteristics for the payload 100.

A latching mechanism 120 is located at the top portion of the payload 100. The latching mechanism may be seen in greater detail in FIG. 3. The latching member includes a plurality of upstanding arms 122 shown to be four in number, spaced equidistantly around the elongated shaft 10. The arms 122 extend from a plate member 124 which is connected to the top of the payload 100. The arms 122 are used to support a plurality of latching levers 126 which latching levers are rotationally mounted on the upper portion of the arms 122 using nut and bolt combination 128. At the lower end of the arms 122 are located catching levers 130 which catching levers are also rotationally mounted to the arm 122 using nut and bolt combinations 132. A spring member 134 is used to maintain the catching lever 130 in an upward direction. The springs 134 have a number of turns surrounding the bolt and, in addition, have end portions which are secured at one end to the arm 122 and at the other end to the catching lever 130.

Figure 3:
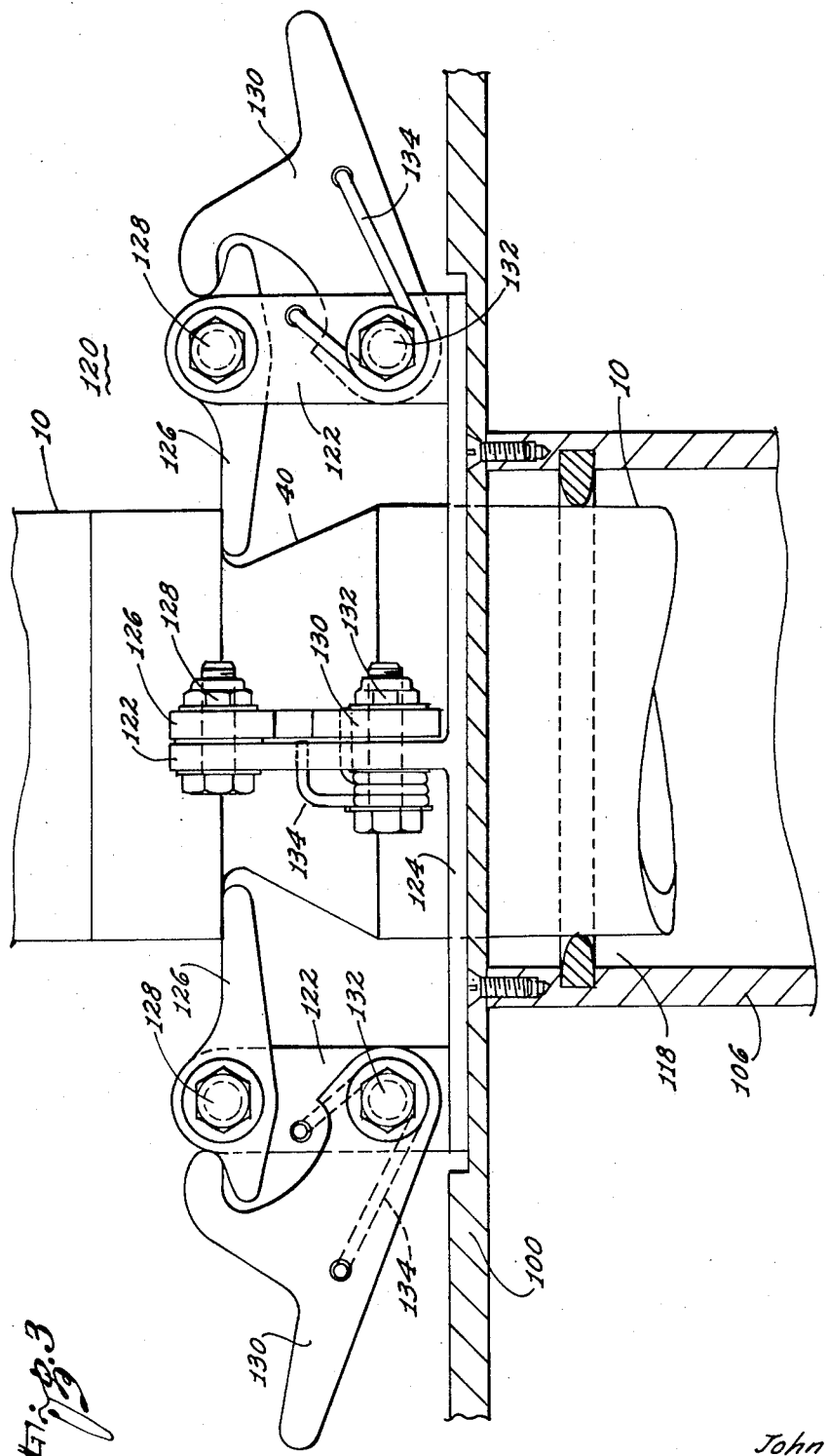
FIG. 3 illustrates in detail the latching mechanism of the payload in engagement with a latching station of the columnar apparatus.

As shown in FIG. 3, the latching means 120 is in a position to have the payload latched at one of the latching stations 40. Specifically, the latching lever 126 extends outwardly to have a horizontal surface engage a horizontal surface portion of the latching stations 40. The catching lever 130 and specifically, the upper arm portion of the catching lever 130 prevents the latching lever 126 from rotation in a downward direction. The latching lever 126 may, however, rotate in an upward direction except when the latching lever 126 engages the horizontal wall portion of the latching station 40.

Figure 4:
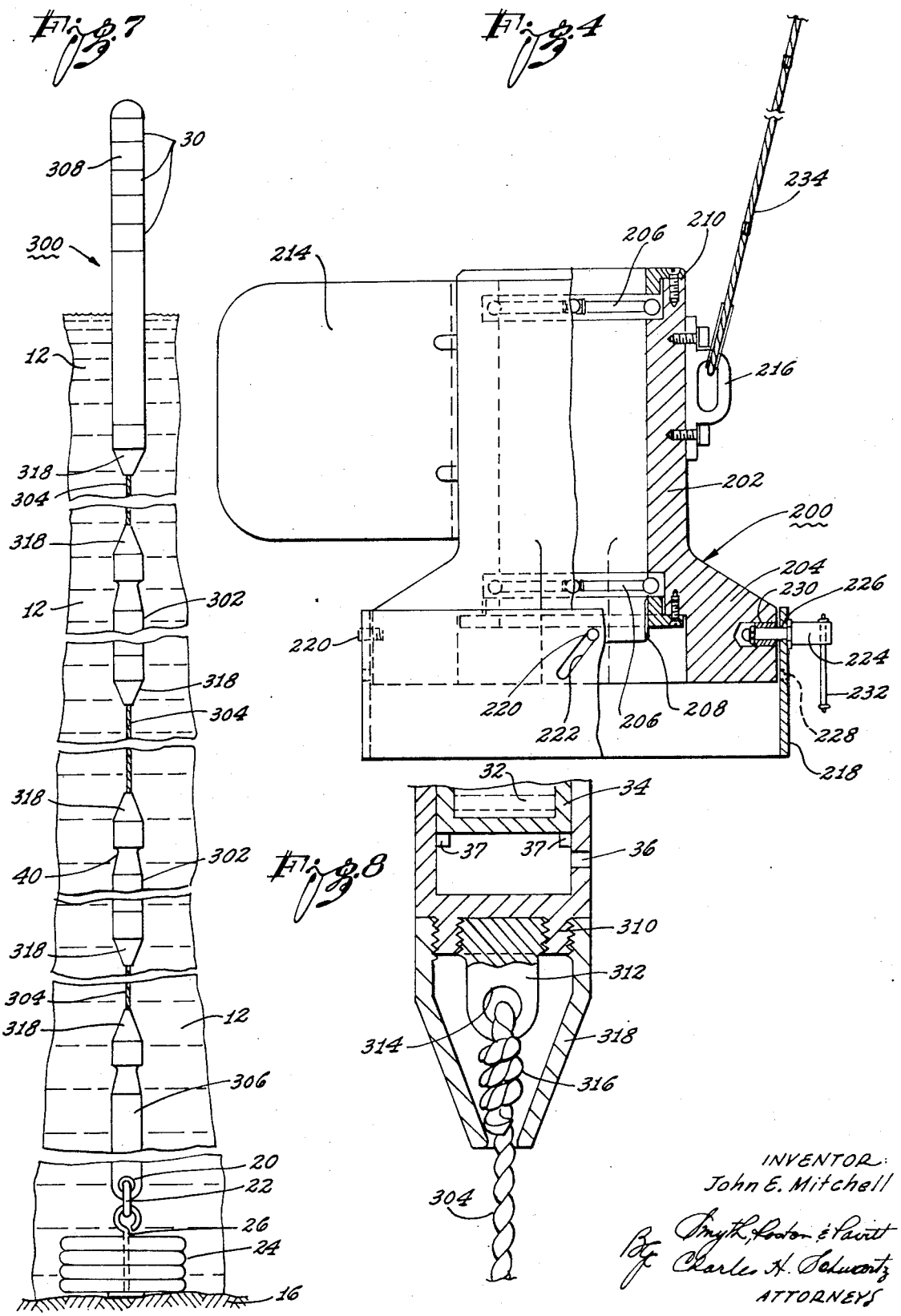
FIG. 4 illustrates in detail the deployment and retrieval means of the present invention.

Returning now to FIG. 2, the deployment and retrieval collar 200 is shown surrounding the elongated shaft member 10. FIG. 4 illustrates the deployment and retrieval means 200 in more detail and, as can be seen with reference to FIG. 4, the deployment and retrieval means essentially includes a heavy cylindrical member 202 including a lower flared end 204. A pair of bearings 206 are located at opposite ends of the deployment and retrieval means to prevent binding of the deployment means on the shaft member 10 during movement of the deployment means along the shaft member. A blade member 208 is used to shear off any marine growth which may attach itself to the elongated shaft member 10. Retainer means 210 and 212 are used to retain the bearings 206 in position.

The deployment and retrieval means 200 also includes a rudder member 214 to maintain the position of the deployment and retrieval means 200 during descent and ascent. An eye member 216 is bolted to the cylindrical portion 202 and a line 234 is secured through the eye member 216 to provide for the deployment and retrieval of the means 200.

The deployment and retrieval means 200 includes a movable ring member 218 which is used in the retrieval of the payload. As shown in FIG. 4, the ring member 214 is in its downward or retrieval position. The ring member 214 is secured to the lower flange portion 204 of the deployment means 200 using a series of pins 220 which extend from the flange portion 204 and slide in grooves 222 in the ring member 218. Specifically three such pins 220 and grooves 222 may be used and with the ring member 218 secured in either its upward or downward position using a removable pin member 224. Such removable pin member 224 may extend through either one of openings 226 or 228 in the ring member 218. An opening 230 in the flange portion 204 is used to seat the pin member 224 and to maintain the ring 218 in either its upward or downward position. A member 232 may be used for the insertion and removal of the pin 224. It is to be appreciated that other means may be used to provide for the positioning of the ring member 218 and that the ring member itself may take a different configuration.

Figure 5:
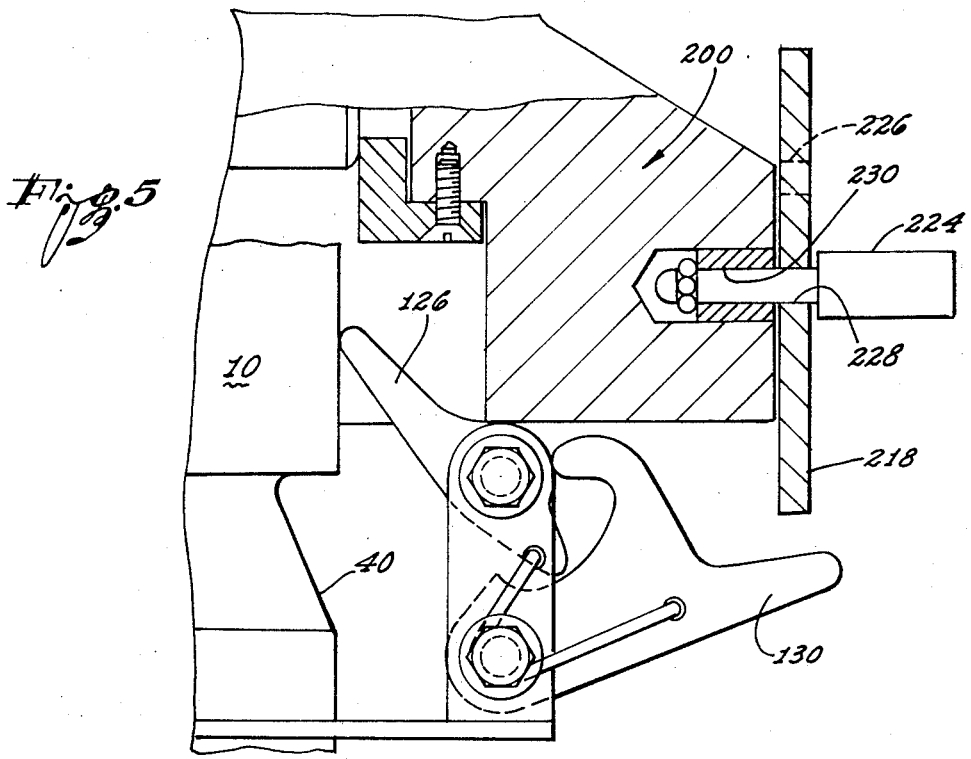
FIG. 5 illustrates in detail the latching means of the payload prior to latching with a latching station.
Figure 6:
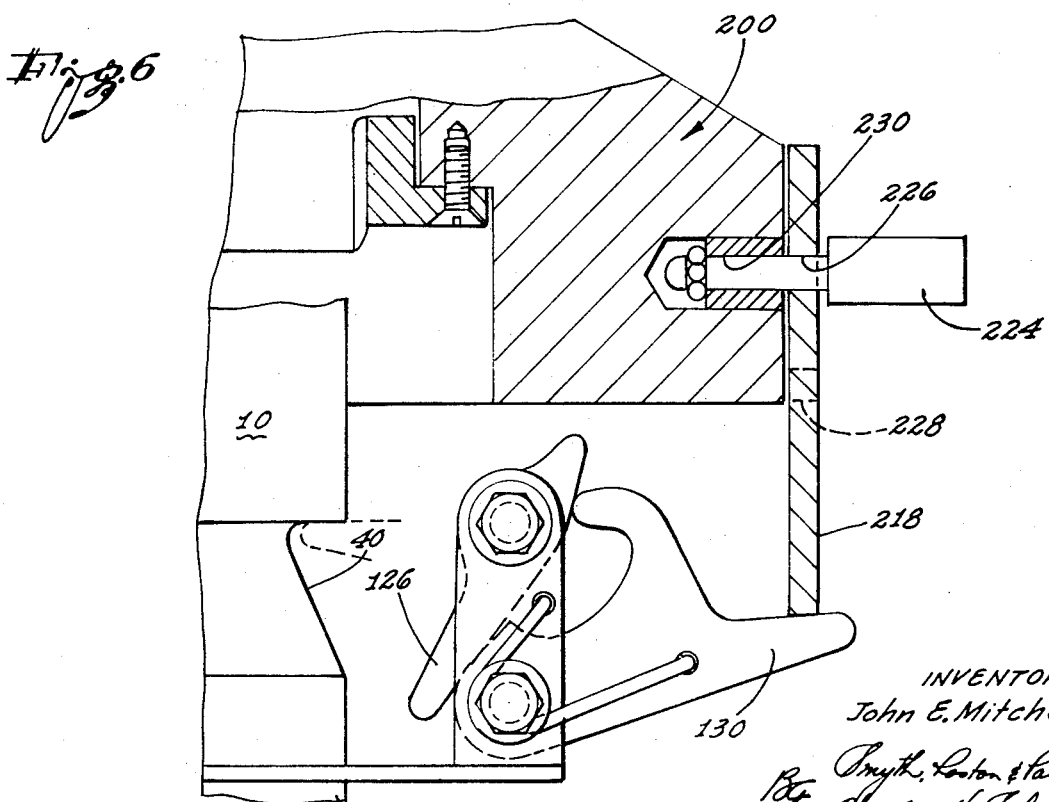
FIG. 6 illustrates in detail the latching means of the payload being unlatched by the deployment means.

Generally the deployment and retrieval of the payload 100 along the elongated shaft member 10 using the deployment and retrieval means 200 may be seen in greater detail with reference to FIGS. 5 and 6. Specifically FIG. 5 shows the payload 100 being deployed along the shaft member 10 immediately preceding arrival at a latching station 40. FIG. 3 illustrates the payload 100 when in a latched position at a latching station 40. FIG. 6 illustrates the position of the latching means immediately after unlatching by the ring member 218 so as to provide for retrieval of the payload 100.

In FIG. 5 the deployment and retrieval means 200 which has a negative buoyancy of a value sufficient to overcome the positive buoyancy of the payload 100, provides for the descent of the payload 100 along the elongated shaft member. The payload 100 has been placed over the elongated shaft member 10 with its latching means as shown in FIG. 5 and the deployment means 200 was then placed above the payload 200 with the ring 218 in the upper position. Actually the rounded top portion of the upper one 28 of the sections of the elongated shaft member 10 provides for the latching levers 126 to rotate to their upward position as shown in FIG. 5 and such latching levers 126 remain in this upper position until the latching levers reach the recessed portion 40.

The payload 200 descends along the elongated shaft member 110 due to the weight of the deployment means 200 and the descent is controlled from the surface by the line 234 attached to the eye bolt 216 shown in FIG. 4, which line 234 may be incrementally marked. When the payload 200 has descended to a desired latching station 40 and when the latching lever 126 is below the horizontal portion of the latching station 40, the deployment means 200 is pulled upward. The positive buoyancy of the payload 200 causes the payload 100 to ascent and the latching levers 126 are then maintained in the latched position as shown in FIG. 3.

The catching levers 130 prevent the latching levers 126 from rotating in a downward direction. The payload 200 at this time is free to rotate from the affects of water current on the rudder 112 shown in FIG. 2 and also to descent slightly, but since this descent is against the natural buoyancy, the payload will tend to remain at or slightly below the latching station 40. It is to be appreciated that the payload 100 as controlled by the deployment means 200 may pass by any number of latching stations 40 until it reaches a desired one of the latching stations. The latching levers 126 as they reach a latching station 40 merely fall downward but are then raised upward due to the sloping wall portion of the latching stations 40. It is only until the deployment means 200 has reached a desired depth as determined by the incrementally marked line 234 is the payload allowed to engage a particular one of the latching stations 40.

To retrieve the payload 200 the ring member 218 is adjusted to its lower position shown in FIGS. 4 and 6. With reference to FIG. 6, the ring member 218 engages the catching lever 130 to deflect the catching lever in a downward direction, which disengages the catching lever 130 from the latching lever 126. At this time the latching lever 126 rotates in a downward direction to be free of the latching station 40. When the deployment and retrieval means 200 is raised upward to allow the catching lever 130 to rotate in an upward direction, the latching lever 126 is maintained in the downward direction by the catching lever 130. FIG. 6 illustrates the retrieval means 200 in a position where the catching lever 130 has already been rotated downward and is now rotated upward and wherein the latching lever 126 is maintained in its downward position. Latching lever 126 normally rotates to the downward position unless held by the catching lever 130 because of a greater weight on the side of the lever 126 facing the elongated shaft member 10.

In a retrieval of the payload 100 means 200 is allowed to descent on the elongated shaft member to depress the catch levers 130 to thereby free the latching levers 126. Once freed, these latching levers 126 no longer resist the horizontal wall portion of the latching station 40 and the payload unit 200 may now ascent the shaft because of its normal positive buoyancy. Of course, the deployment and retrieval means 200 must be pulled up ahead of the payload but this may be accomplished rather quickly and it is not necessary to have any attachment to the payload itself.

The deployment and retrieval system of the present invention may include the use of suitable plastic materials which inhibit marine growth and specifically, the elongated shaft member 10 may be constructed almost entirely from such plastic material. In addition, portions of the payload such as the floatation chamber 102 and the rudder 112 may also be constructed from such plastic material. Since the deployment and retrieval collar 200 will only be under water for short periods of time, it is not necessary to construct such deployment and retrieval means of such plastic material.

It is therefore seen that in the method of operation of the present invention, the elongated shaft member 10 may be properly positioned at a desired location using the anchor 24 or some other means of attaching the elongated shaft member at a desired stationary position. A payload is then placed over the uppermost section of the elongated shaft member to surround the elongated shaft member. Because of the normal positive buoyancy of the payload, the payload will not descend unless a weighted deployment and retrieval means is used. Such deployment and retrieval means has a negative buyoyancy and is coupled to the payload to provide for a descent of the payload and the deployment means along the elongated shaft member to a desired latching station which may be any one of a number of such latching stations.

When the payload and deployment means reaches the latching station, the deployment means is pulled upward and the payload automatically latches at such latching station. After the desired period of time to provide for the measurements to be accomplished by the instruments or apparatus within the payload the deployment and retrieval means is now allowed to descent the elongated shaft member and with the deployment and retrieval means including additional means to unlatch the latching mechanism of the payload. When the unlatching is accomplished, the deployment and retrieval means is pulled upward and the payload ascends due to its normal positive buoyancy.

FIG. 7 illustrates an alternative construction of the invention wherein an elongated shaft member 300 includes a plurality of shaft sections 302 linked together with lines 304. It is to be appreciated that any number of such sections 302 may be included so as to provide for a desired length of the elongated shaft member 300 to extend to the ocean floor 16.

The elongated shaft member 300 may also include a bottom section 306 which has slight differences from the sections 302. Specifically, the section 306 may include the opening 20 which receives the ring member 22 in a similar manner as shown in FIG. 1. The anchor 24 which may be composed of the plurality of weights is coupled to the ring 22 through the use of the eye bolt 26. The anchor 24 insures that the elongated shaft member 300 is deployed at a specific location on the ocean bottom 16 and will be maintained at such location. The use of the eye bolt 26 and ring 22 allows for a certain amount of flexibility in movement between the elongated shaft member 300 and the anchor 24 but it is to be appreciated that the elongated shaft member 300, because it is relatively small in diameter, and has a smooth outer surface presents a relatively small, smooth frontal area to the water 12 and, therefore, does not receive large hydrodynamic forces.

An uppermost one 308 of the sections forming the elongated shaft member 300 may extend out of the water 12 and may include reflective tape portions 30 which serve to provide for a visual detection of the elongated shaft member 300 and also to allow for a radar detection of the elongated shaft member 300. The uppermost section 308 may extend a significant vertical distance in the air above the water so that it is readily visible. It can be seen that because of the relatively small diameter of the elongated shaft member 300 and because of the smooth outer portion of the shaft member, there is a small, smooth frontal area presented to the surface of the water 12. It is in this upper surface area where waves cause relatively large hydrodynamic forces and the design of the present invention minimizes such forces in the elongated shaft member.

The sections 302 and the sections 306 and 308 may be hollow and may be filled with a buoyant compression resistant fluid such as gasoline or other fluids so as to provide for a positive buoyancy in the elongated shaft member 300. This positive buoyancy should be not too large so as to overcome the weight of the anchor 24 and should generally be near neutral but on the positive buoyancy side. The elongated shaft member 300 essentially floats upward from the point of attachment to the anchor 24 and because of its minimal frontal surface to the water 12 will maintain this relatively vertical position even when subjected to underwater and surface currents.

Each section of the shaft member 300, in addition to being filled with the compressive buoyant fluid 32, may include the movable seal 34 shown in FIGS. 1 and 8 which compensates for pressure variations in the water in the same manner as FIG. 1. The opening 36 shown in FIG. 8 allows the water to enter and thereby provide for pressure equalization between the water 12 and the fluid 32.

The various shaft sections of the elongated shaft member are linked together by the lines 304 as shown in FIG. 8. A double threaded portion 310 extends from each end of a section. A threaded plus member 312 including an opening 314 is used to receive the line 304 for attachment as shown at position 316. An outer conic section 318 is threaded on the portion 310 to guide the payload and deployment and retrieval means as they are moved along the elongated shaft member 300.

Although the invention has been described with reference to particular embodiments, the invention is only to be limited to the appended claims.

I claim:

1. A payload deployment system for deployment of a payload within a particular environment, including
    an elongated shaft member having a positive buoyancy relative to the environment and including sections having a uniform outer cross section and having at least one section including a recessed portion which recessed portion forms a latching station,
    a payload means having a positive buoyancy relative to the environment and including a portion surrounding the elongated shaft member to have the payload guided for deployment by the elongated shaft member and with the payload means also including latching means for engagement with the recessed portion forming the latching station of the elongated shaft member to provide a latching of the payload means at a predetermined position on the shaft member, and
    a deployment means having a negative buoyancy relative to the environment and including a portion surrounding the elongated shaft member and with the deployment means coupled to the payload to produce a movement of the deployment means and the payload to the latching station of the elongated shaft member.

2. The payload deployment system of claim 1 including a plurality of sections each including a recessed portion to form a plurality of latching stations and with the latching means of the payload constructed to pass the latching stations without latching for a first direction of movement of the payload along the elongated shaft member and to automatically latch at a latching station for a second opposite direction of movement of the payload along the elongated shaft member.

3. The payload deployment system of claim 1 wherein the deployment means additionally including means for unlatching the latching means of the payload to provide for the retrieval of the payload in accordance with the positive buoyancy of the payload.

4. A payload deployment system for deployment of a payload within a particular environment, including an elongated shaft member having a substantially uniform outer cross section and having at least one recessed portion which recessed portion forms a latching station, a payload having a buoyancy relative to the environment to provide for a movement of the payload in a direction opposite to the direction of deployment and including a portion coupled to the elongated shaft member and with the payload means also including latching means having a first operative position and a second inoperative position and providing for engagement with the recessed portion forming the latching station of the elongated shaft member when in the first operative position to produce a latching of the payload means at a predetermined position on the shaft member and for bypassing the recessed portion without latching when in the second inoperative position, and a deployment means having a buoyancy relative to the environment to provide for a movement of the deployment means in the direction of deployment and having a buoyancy sufficient to overcome the buoyancy of the payload and including a portion coupled to the elongated shaft member and with the deployment means coupled to the payload to produce a movement of the deployment means and the payload to the latching station of the elongated shaft member and with the deployment means additionally including means for unlatching the payload by providing for the second inoperative position of the latching means so that the payload moves in a direction opposite to the direction of deployment.

5. The payload deployment system of claim 4 including a plurality of recessed portions at predetermined positions along the elongated shaft member forming a plurality of latching stations and wherein the latching means in the first operative position is constructed to bypass the recessed portion without latching in the direction of deployment and to latch in the recessed portion in the direction opposite to deployment.

6. The payload deployment system of claim 5 for use in water wherein the elongated shaft member is constructed to have a positive buoyancy, the payload has a positive buoyancy and the deployment means has a negative buoyancy.

7. A columnar deployment apparatus for deployment of a payload within a particular environment and wherein the payload includes an open portion and also includes a latching means, including an elongated shaft member having a substantially uniform cross section, the elongated shaft member including at least one section having a recessed portion forming a latching station at a predetermined position along the elongated shaft member which latching station receives the latching means of the payload to provide for the stationing of the payload at the predetermined position, the elongated shaft member receiving the open portion of the payload for guiding the payload to the latching station, the recessed portion extending circumferentially around the shaft member to provide for latching of the payload at any radial position of the payload.

8. The columnar deployment apparatus of claim 7 wherein the recessed portion includes a sharply inclined wall relative to the outer surface of the shaft member and wherein the latching means engages the wall to provide for latching.

9. The columnar deployment apparatus of claim 7 including a plurality of recessed portions along the length of the elongated shaft member to provide for a plurality of latching stations.

10. A columnar deployment apparatus for deployment of a payload within water and wherein the payload includes an open portion and also includes a latching means, including an elongated shaft member having a substantially uniform cross section and having a positive buoyancy relative to water, the elongated shaft member including at least a plurality of sections and with some of the sections having at least one recessed portion forming a plurality of latching stations at predetermined positions along the elongated shaft member which latching stations receive the latching means of the payload to provide for the stationing of the payload at any one of the plurality of predetermined positions, the elongated shaft member receiving the open portion of the payload for guiding the payload to any one of the plurality of latching stations, and the recessed portion extending circumferentially around the shaft member to provide for latching of the pay-load at any radial position of the payload.

11. A deployment means for deploying a payload within a particular environment along a columnar deployment apparatus and with the payload having a positive buoyancy relative to the environment and having a latching means and with the columnar deployment apparatus formed as an elongated shaft member and having at least one portion forming a latching station, the deployment means including first means forming an open portion for surrounding the elongated shaft member to provide for a guiding of the deployment means along the elongated shaft member, second means connected to the first means for coupling to the payload to provide for a guiding of the payload as the first means is guided along the elongated shaft means, the combination of the first and second means having a negative buoyancy relative to the environment greater than the positive buoyancy of the payload to guide the payload along the elongated shaft member to a position to have the latching means of the payload engage the latching station of the elongated shaft member so as to deploy the payload at the latching station, and the latching means of the payload having an unlatched position and with the deployment means including a third means having operative and inoperative positions and with the operative position of the deployment means producing the unlatched position of the latching means of the payload when the deployment means is guided by the elongated shaft member to the payload is released from the latching station and is automatically retrieved due to its positive buoyancy.

12. A payload structure for deployment within a particular environment and for use with a columnar deployment apparatus formed as an elongated shaft member and having at least one recessed portion forming a latching station and with the payload structure including first means forming an open portion for surrounding the elongated shaft member to provide for a guiding of the payload structure along the elongated shaft member, and latching means for engagement with the recessed portion of the elongated shaft member to provide for the deployment of the payload structure at the latching station of the columnar deployment apparatus, and with the latching means having a first latching position to automatically latch with the recessed portion of the elongated shaft member in a first direction of movement of the payload and a second unlatched position to bypass the recessed portion for both directions of movement of the payload.

13. The payload structure of claim 12 wherein the payload structure has a positive buoyancy relative to the environment and wherein the latching means has a first latching position and a second unlatching position and with the positive buoyancy of the payload providing for a retrieval of the payload structure with the latching means in the second position.

14. The payload structure of claim 12 including a sealed chamber enclosing a fluid having a specific gravity less than the specific gravity of the environment so as to provide the positive buoyancy of the payload structure.

15. A method of deploying a payload within a particular environment along a columnar deployment apparatus situated within the particular environment and using a deployment means and with the payload having a positive buoyancy relative to the environment and having a latching means and an open portion and with the columnar deployment apparatus formed as an elongated shaft member and having at least one portion forming a latching station and with the deployment means having a negative buoyancy relative to the environment and with such negative buoyancy greater in value than the positive buoyancy of the payload and having an open portion, including the steps of placing the open portion of the payload around the elongated shaft member and guiding the payload a short distance along the elongated shaft member, placing the open portion of the deployment means around the elongated shaft member to couple to the payload so as to provide for a guiding of the payload along the elongated shaft means due to the deployment means having a negative buoyancy relative to the environment greater than the positive buoyancy of the payload, and controlling the deployment means to guide the payload along the elongated shaft member to a position to have the latching means of the payload engage the latching station of the elongated shaft member so as to deploy the payload at the latching station.

16. The method of claim 15 wherein the deployment means includes means in an operative position to unlatch the latching means of the payload and including the additional step of placing the open portion of the deployment means around the elongated shaft member to guide the deployment means to the payload to unlatch the payload and with the payload automatically retrieved because of its positive buoyancy.

* * * * *